(12) United States Patent
Kauvar et al.

(10) Patent No.: US 6,444,992 B1
(45) Date of Patent: Sep. 3, 2002

(54) HIGH THROUGHPUT MICROSCOPY

(75) Inventors: Lawrence M. Kauvar; John Sedat, both of San Francisco, CA (US)

(73) Assignee: Trellis Bioscience, Inc., Mountain View, CA (US)

( * ) Notice: Subject to any disclaimer, the term of this patent is extended or adjusted under 35 U.S.C. 154(b) by 0 days.

(21) Appl. No.: 09/394,842

(22) Filed: Sep. 13, 1999

Related U.S. Application Data

(60) Provisional application No. 60/102,434, filed on Sep. 30, 1998.

(51) Int. Cl.[7] ............................................. G01N 21/64
(52) U.S. Cl. .............................. 250/461.1; 250/458.1
(58) Field of Search .......................... 250/458.1, 459.1, 250/461.1, 461.2

(56) References Cited

U.S. PATENT DOCUMENTS

| | | | |
|---|---|---|---|
| 3,762,798 A | 10/1973 | Grubb et al. | 350/86 |
| 4,589,741 A | 5/1986 | Clegg | 350/532 |
| 4,938,654 A | 7/1990 | Schram | 414/757 |
| 5,096,291 A | 3/1992 | Scott | 356/237 |
| 5,119,434 A | 6/1992 | Bishop et al. | 382/8 |
| 5,129,009 A | 7/1992 | Lebeau | 382/8 |
| 5,212,028 A | 5/1993 | Fujino | 430/22 |
| 5,367,401 A | 11/1994 | Saulietis | 359/398 |
| 5,471,066 A | 11/1995 | Hagiwara | 250/559.48 |
| 5,684,628 A | 11/1997 | Gerhard | 359/391 |
| 5,690,894 A | * 11/1997 | Pinkel et al. | 422/68.1 |
| 5,777,783 A | * 7/1998 | Endou et al. | 359/385 |
| 5,986,271 A | * 11/1999 | Lazarev et al. | 250/458.1 |
| 6,020,591 A | * 2/2000 | Harter et al. | 250/458.1 |

FOREIGN PATENT DOCUMENTS

| | | |
|---|---|---|
| WO | WO 98/17992 | 4/1998 |

OTHER PUBLICATIONS

"Local Fluorescence Quenching Probe," *IBM Technical Disclosure Bulletin* (Aug. 1992) 35(3):146–148.

* cited by examiner

*Primary Examiner*—Constantine Hannaher
(74) *Attorney, Agent, or Firm*—Morrison & Foerster LLP

(57) ABSTRACT

An apparatus for high resolution, high throughput, three-dimensional fluorescence microscopy with a rotatable circular disc for mounting samples to be viewed and multiple CCDs and beam splitters as detectors for the fluorescence emission.

16 Claims, 2 Drawing Sheets

HIGH THROUGHPUT MICROSCOPY

This Application claims priority under 35 U.S.C. §119(e) to provisional application No. 60/102,434 filed Sep. 30, 1998. The content of this application are incorporated herein by reference.

TECHNICAL FIELD

The present invention relates generally to high resolution, three dimensional, fluorescence microscopy systems and methods for their use. More, specifically the invention represents specific improvements to existing wide-field, optical sectioning microscopes systems designed for acquisition and analysis of multi-dimensional fluorescence images.

BACKGROUND ART

The field of optical microscopy has been revolutionized in recent years by the widespread use of confocal and fluorescent microscopes. Combining laser illumination and digital image processing, these optical instruments allow biologists to obtain high-resolution, three dimensional fluorescent images.

Deconvolution microscopy, an alternative approach to laser-scanning cofocal microscopy, is gaining in popularity. This technology avoids the high costs and limitations of laser illumination and is ideal for live-cell studies requiring high resolution and multiple wave lengths. Typical of the devices of this type is the Delta Vision® microscope system. Delta Vision® system is a wide-field optical sectioning microscope system. See, for example, info@api.com and U.S. Pat. No. 5,684,628. The basic concepts embodied in the Delta Vision® system include: collection of imaging data directly in digital form using a high quality charge coupled device, i.e., CCD (silicon chip) area detector; computation removal of noise arising from light leakage into the focal plane from adjacent planes, provision of a facile user interface for data capture and analysis.

DISCLOSURE OF THE INVENTION

The invention is directed to improvements to a standard wide field microscope system, e.g. the Delta Vision® system. The improvements permit imaging of more than 1,000, preferably more than 10,000 samples, e.g. antibody/antigen reactions, per day. The basic system to which these improvements are applied share generally the features of a fluorescent microscope—i.e., excitation and emission filters, an objective lens, a movable stage, and image recording by CCD. Such basic instruments also are able to image transmitted light.

The features which constitute improvements to this basic design fall into three general categories:

Optical features which constitute the improvements of the invention include a pulsed light source, a fiber-optic light source, a computer-controlled condenser, infinity focusing, polychromatic beam splitting and multiple CCD detectors rather than a single CCD detector.

Mechanical features which comprise the improvements of the invention include a rotatable circular disc in place of a conventional sample holder, wherein the disc may also contain further design features creating separate small wells; reagent dispenser and readout stations positioned around the disc, an arm that moves the dispenser and readout heads radially; a stage-tilting device, and a temperature-controlled specimen chamber.

In addition, the improvements comprise computational features including a control and calibration program, a nonhomogeneous illumination compensator, chromatic aberration compensator, a Fourier space feature detector, and a real space feature detector.

One object of the innovation is to minimize photodamage to the samples by pulsing the light source at a speed consistent with the rate of data collection. Fiber optics plumbing, pre- and post-specimen, with a rotating dichroic filter in the illumination path, enables more efficient automated operation. An automated condenser (e.g. to slide in masks for differential interference and polarization imaging) is also advantageous.

Another aspect of the invention relates to infinity imaging. This employs an objective lens with a sliding element to allow for switching between high and low magnification, a more efficient system than conventional rotating head microscopes. The image is further focused by sliding a secondary lens into the light path downstream from the objective lens. This simplifies positioning of the objective lens since the computer controlled motor for focusing can be placed physically out of the way. "Infinity imaging" also enhances the range of magnification possibilities, and eliminates moving parts from the proximity of the sample. This simplifies temperature control, for example permitting cooling of the specimen. Cooling the specimen sharpens the emission line widths enhancing the ability to recognize differences in hues.

A still further aspect of the invention is the use of beam splitters in conjunction with filters to allow the same primary light to be imaged onto multiple CCD detectors. Multiple detectors allow faster collection of data and more reliable image registration for detection of multiple colors.

In mechanical features, in one aspect, the invention employs rotatable circular discs in place of the typical microscope slides or 96-well plates. These discs are placed on a rotatable stage. Typically, the disc can range in size from a 4-inch diameter to 9 or 12 inches. The exact size of the disc is not critical. These discs, which may be made of glass, are also available from the computer chip industry. The discs can be painted with hydrophobic materials to form barriers which would define sample wells using lithographic techniques. The lithographic techniques employed are similar to those taught in U.S. Pat. No. 5,212,028, the contents of which are incorporated herein by reference. Using these techniques, a 4-inch disc can be painted, for example, to form 2 mm segments which creates 1,000 sample wells and to form 1 mm segments which creates 2,500 wells. Alternatively, adhesive lines that allow the deposit of small specimen carriers can be used.

Other advantageous mechanical features of the invention are related to the use of these multispecimen discs. Thus, reagent dispensers and readout stations may be positioned around the disc and may be fitted with arms that move the dispensers and read-heads radially. Other mechanical features include a stage-tilting device and a temperature controlled specimen chamber, facilitated by the infinity focusing feature.

Computational aspects of the invention include dedicated circuitry and equivalent software for computational processing in areas which include data capture, photon reassignment feature detection, counting and presentation. These measures facilitate control and coordinate data handling. Further, the circuitry and software equivalent permit the recognition of signature curves of particulate labels such as latex beads. This would permit the system to count and identify individual tags. An alternative filter can be designed to read microbar codes for sample tracking.

Other filters can also be defined computationally to improve the accuracy of cell counting. Cell borders can be recognized by virtue of lipid soluble dye, while definition of the nucleus can be achieved using a DNA stain like DAPI.

DETAILED DESCRIPTION OF THE INVENTION

Figure 1:
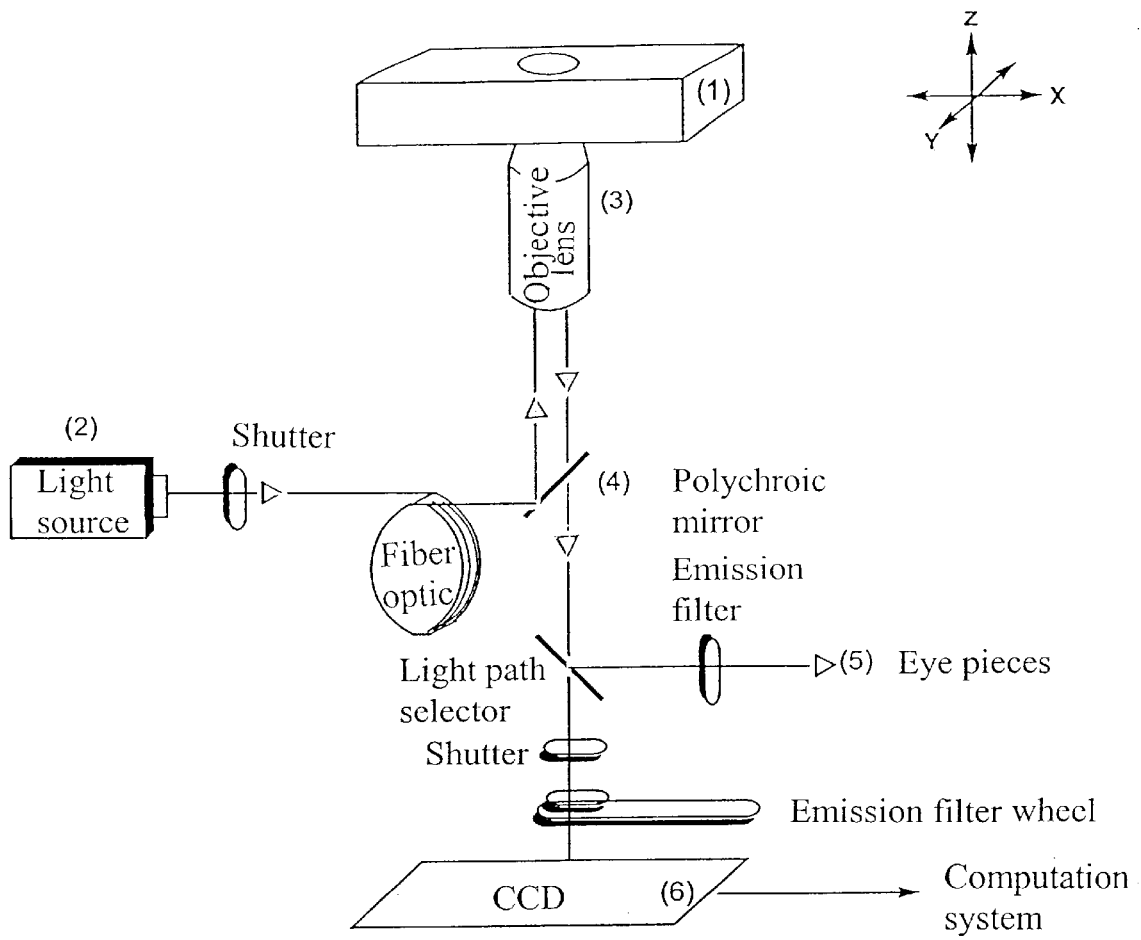
FIG. 1 illustrates a high resolution fluorescence microscope of the prior art which includes a light source (1), objective lens (3), eye pieces (5) and other enumerated elements.

The present invention represents an improvement over systems which include elements, for example, present in the devices described in U.S. Pat. No. 5,684,628, incorporated herein by reference. Such fluorescent microscopes provide the basis of image collection. A conventional fluorescent microscope is shown in FIG. 1. A specimen is labeled with a fluorescent tag and placed on the microscope stage (1) which, in this conventional embodiment, is movable in an Cartesian coordinate system. The irradiating light is supplied from an arc lamp (2) through appropriate filters and shutters and through a fiber-optic system to an objective lens (3). The emitted light is filtered through a polychroic mirror (4) and deflected to the eye for visual inspection (5) or to a CCD array for detection using appropriate circuitry (6).

Figure 2:
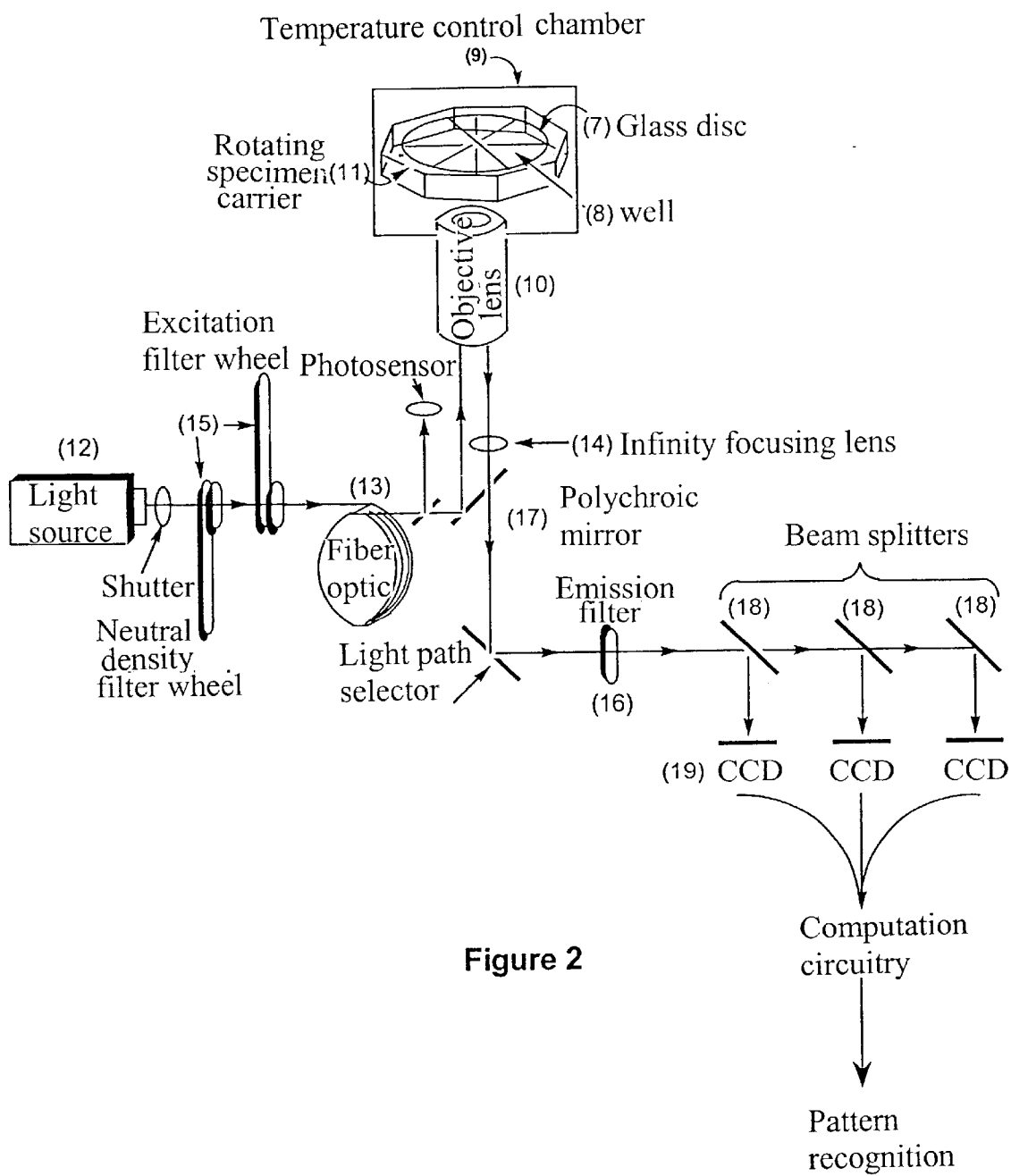
FIG. 2 illustrates one embodiment of the high throughput microscope (HTM) system of the invention.

A modified form of the conventional system containing the improvements that comprise the invention is shown in FIG. 2. The XYZ microscope stage is replaced by a rotatable stage (11) (specimen carrier) which supports a circular disc (7) specimen holder (disc). The specimen disc is divided into individual sample compartments (8) (well) which may be wells separated by hydrophobic barriers or adhesive segments. Disc technology is now available in the semiconductor chip industry for inspection, handling and automation of chip treatment. The system shown in FIG. 2 can also be modified so that the disc can be placed on multiple positioning stages and/or on stages provided with stage tilting devices that permit the study of the microscopy samples at a variety of angles reducing certain kinds of light scattered noise. The circular specimen disc allows for more quantitative channels for faster reading, tracking of temporal phenomena, and the processing of large numbers of samples in parallel. The system can be designed to include one or more disc cassette towers which increases automation possibilities. The discs can be selectively moved from a cassette tower to the inspection stage, selectively rotated at a variety of angles, if desired, removed from the inspection stage and selectively placed in a separate cassette tower or returned to the same position in the original cassette tower for storage or for subsequent viewing. This can be done manually or automatically. See for example U.S. Pat. Nos. 4,938,654; 5,096,291; 5,119,434; 5,129,009; and 5,471,066, respectively, incorporated herein by reference. The instrument may also be provided with a reagent dispenser and multiple readout stations around the circle described by the stage and disc. The dispensers and readout stations may be moved radially and the stage and disc rotated to provide multiple sampling opportunities.

The entire specimen compartment may be enclosed in a temperature controlled environment (9), schematically indicated in FIG. 2. For example, to improve emission spectrum resolution, very low temperatures such as those of liquid nitrogen or liquid helium may be used. A detailed description of a labeling system which permits a multiplicity of hues to be generated on a particulate support, such as latex beads, is described in copending application U.S. Ser. No. 09/146,984 filed Sep. 3, 1998 and incorporated herein by reference. Briefly, by varying the ratio of dyes of primary colors on the particulate supports, or by varying the intensity of individual dyes, a large number of hues can be created. Cooling to very low temperatures permits more than ten primary colors for use in creating these individual hues, defined as the ratio of the primary colors attached to the beads. At present, latex beads are made with a doping precision better than ±5%, so that even specifying only ten gray scale levels for each of ten primary colors provides ten billion distinguishable tags.

Of course, it is still within the invention to use conventional fluorescent labeling as well as the multihued fluorescent tags described in the above-referenced copending application.

In the embodiment wherein a closed chamber (9) encasing the sample is used, the objective lens (10) will generally protrude into the chamber. Eliminating the axis movement is the objective and thus desirable to maintaining a tight seal. The stage containing the disc (7) is movable independent of the objective lens. After a specimen is loaded with any desired fluorescent label, it is placed in a sample well (8) of the disc and positioned on the stage (11) and the area of interest is determined using ordinary visual inspection. Excitation light is then introduced to the sample through the objective lens (10) or through an optical fiber(s). As stated above, the temperature may be controlled. Warming permits one to maintain the samples within physiologically desirable temperature ranges. Cooling of the disc or individual sample can sharpen emission band widths which enhance hue resolution.

In one embodiment of the present invention the light source (12) is pulsed so as to control any photodamage of the sample and the exicitation beam is conducted through the objective lens by fiber-optic conduits (13).

The automated image collection features of the system are used to acquire a series of images. After deconvolution, the images are combined to form a three-dimensional view of the specimen.

The series of images used to form the three-dimensional view is collected by moving the focal plane of the objective lens (10) through the specimen. This movement, usually called a z-scan, can be accomplished by moving either the sample or the objective lens. Alternatively, a secondary lens (14), in an infinity focusing system may be employed. The typical distance between sections ranges between 0.1 $\mu$m to 5 $\mu$m, with a total range of 5 mm. In the embodiments that include infinity focusing, the objective lens is coupled with a secondary sliding element lens (14). This secondary lens is located later in the light path. This combination also facilitates the controlled shift between low and high magnification. Extremely precise microstepping motors are used to achieve the small movements necessary.

In one embodiment, the light source is a mercury light source, which provides the illumination from the UV to the near-IR. This light source is capable of being pulsed at a speed consistent with the rate of data collection to minimize photodamage to microscopy sample. An optical fiber optic light scrambler homogenizes the illumination light, smoothing out arc lamp wander and evenly filling the back aperture of the objective lens. Excitation and emission wave lengths appropriate for the fluorescent probes being used are selected by multi-cavity interference filters. These filters transmit the desired wavelengths, while blocking more than 99% of the light from other regions of the spectrum. Between the excitation (15) (excitation filter wheel; neutral density filter wheel) and emission filter (16) is a movable custom polychroic mirror (17), which is a key component for wave length selection. The mirror consists of carefully selected reflection and transmission bands, designed to provided optimal performance for a wide variety of commonly used fluorescent probes. The use of a single mirror to image all probes means that no artifacts are introduced from components moving within the critical path. This is significant since artifacts resulting from optical component motion are often indistinguishable from real information and can cause misinterpretation of the specimen characteristics.

Precise positioning of the emission filters (15) minimizes artifacts from wedging, dust, and filter variation. Although such artifacts can sometimes be minimized with digital processing techniques, details obscured by dirty optics will simply not be present in the final image. Superior images will yield superior results after deconvolution. Precise filter positioning allows different fluorescent probes to be imaged before moving the specimen. This approach provides the extremely accurate image alignment that is critical for co-localization studies. Systems that conduct a complete z-scan for each probe being imaged may suffer from image registration problems.

At least one CCD detector, typically cooled and scientific grade, collects the fluorescent images. This type of detector provides very sensitive light detection, low noise, and an extremely linear response to light intensity. Beam splitters (18) in conjunction with filters can be placed earlier in the light path relative to the CCD detector. This allows the same primary light to be imaged onto multiple CCD detectors (19). Multiple detectors permit faster collection of data and more reliable detection of mix-and-match colors. The use of multiple CCD detectors (19) is shown in FIG. 2. This permits better discrimination between multihued particles and facilitates the use of multihued particle detection schemes.

Small photon detector elements allow the image to be oversampled, increasing the resolution possible with the system. Images acquired by the detectors are collected by suitable circuitry and the data managed by appropriate software to be displayed and/or stored in digital format.

After the images have been collected, they can be viewed and measured using a variety of powerful tools. These tools include the capacity to rotate, measure, highlight selected regions, and modify the image contrast. Deconvolution circuitry computationally reassigns blur present in the image. After correcting for variations due to arc flicker, an automated deconvolution process is triggered dedicated circuitry speed up the computational work. Equivalent circuit can be created by programming a more flexible circuit or by using software to create temporary circuits.

In the data capture aspect of the invention, each CCD chip has the accessory circuitry for data transfer and reinitialization. These need to be synchronized with the illumination system and specimen identifier as well as with control and calibration functions such as checking and correcting for bad pixels or dirt on the lens. The associated circuitry also performs photon reassignment—i.e., Fourier space deconvolution. The actual photon counts are the result of a convolution of point-spread function and the real sample. Correction for the differences in focus of different wavelengths—chromatic aberration—can be most conveniently corrected after this step. Thus, the computation system refracts streams of photons into image pixels and adjusts gain on a pixel-by-pixel basis.

The use of deconvolution in Fourier space permits the identification of certain features such as spherical latex beads, and permits a "bar code" to be embedded into a specimen for readout at this step. Photolithography can be used to create one or two dimensional patterns on a rod or chip of plastic which could be on the sample carrier or added to the sample. Thus, the identification of the sample being viewed is greatly aided. Similarly, in a deconvoluted real-space image, particular objects can be identified. Cell nuclei, for example, have characteristic dimensions and are typically separated from each other by cell membrane.

The plethora of information generated by the HTM can be managed by the circuitry. For example, in tissue typing, the deconvoluted image can be collapsed into a cartoon wherein multihued beads, each carrying a distinct typing antibody, are only counted if they are on the surface of white cells which are recognized as objects with having an outer membrane stained with a lipophilic dye, said membrane surrounding a nucleus stained, for example, with DAPI. They can be distinguished from beads not on the surface of white cells as well as those associated with nonnucleated red cells. In this application, the hue of the beads on a single cell surface should be consistent.

Thus, the multiplicity of improvements provided the present invention permits a truly high throughput system for analysis of large numbers of samples, each probed with a large number of detection agents. The many applications include tissue typing, identification of antigen-antibody interactions, real-time observation of intracellular movement of components and the like. Particular applications of this technology are further described in copending U.S. Ser. No. 09/144,609 filed Aug. 31, 1998 and incorporated herein by reference.

What is claimed is:

1. An apparatus for high resolution, three dimensional, fluorescence microscopy including:
   an objective lens,
   a microscope stage for receiving and positioning a means for containing one or more samples to be viewed through said lens,
   a light source providing light from the UV to the near IR wavelengths,
   an excitation light pathway from said light source through said lens to said sample which includes means for directing light from said light source to said lens and means for selecting a desired wave length for excitation,
   an emission light pathway from said sample through said objective lens to at least one CCD which includes a light path selector and an emission filter means, and
   a computer imaging means connected to said CCD,
   wherein the means for containing one or more samples is a rotatable circular glass disc,
   wherein said rotatable circular disc is divided into a multiplicity of sample-receiving areas, and
   wherein said areas are defined by hydrophobic barriers, or
   wherein the sample-receiving areas are defined by an adhered adhesive.

2. The apparatus of claim 1 which further comprises at least one reagent dispensing means proximal to the periphery of the rotatable circular disc.

3. The apparatus of claim 2 which further comprises a means to move said dispensing means radially.

4. The apparatus of claim 1 which further comprises a secondary sliding lens downstream of said objective lens.

5. The apparatus of claim 1 which further includes a temperature controlled chamber surrounding said microscope stage.

6. The apparatus of claim 1 which further includes a pulsing light source which emits light at a speed consistent with the speed of data collection.

7. The apparatus of claim 6 which further comprises a secondary sliding lens downstream of said objective lens.

8. The apparatus of claim 1 which further includes means for recognizing patterns.

9. The apparatus of claim 8 which further comprises a secondary sliding lens downstream of said objective lens.

10. The apparatus of claim 8 which further includes a pulsing light source which emits light at a speed consistent with the speed of data collection.

11. The apparatus of claim 10 which further comprises a secondary sliding lens downstream of said objective lens.

12. An apparatus for high resolution, three dimensional, fluorescence microscopy applications including:

an objective lens, a microscope stage for receiving and positioning a means for containing one or more samples to be viewed through said lens, a light source providing light from the UV to the near IR wavelengths, an excitation light pathway from said light source through said lens to said sample which includes means for directing light from said light source to said lens and means for selecting a desired wave length for excitation, an emission light pathway from said sample through said objective lens to multiple CCDs which pathway includes a light path selector, an emission filter means, and multiple beam splitters which cause the same primary fluorescent light to be imaged simultaneously on multiple CCD detectors, and a computer imaging means connected to said CCDs.

13. The apparatus of claim 12 which further comprises a secondary sliding lens downstream of said objective lens.

14. The apparatus of claim 12 which further includes a rotatable glass circular disc as the means containing one or more samples for viewing.

15. The apparatus of claim 12 which further includes a pulsing light source which emits light at a speed consistent with the speed of data collection.

16. The apparatus of claim 12 which further includes means for recognizing patterns.

* * * * *